(12) United States Patent
Sakai

(10) Patent No.: US 10,111,051 B2
(45) Date of Patent: Oct. 23, 2018

(54) COMMUNICATION APPARATUS, CONTROL METHOD THEREFOR, PROGRAM, AND STORAGE MEDIUM

(71) Applicant: CANON KABUSHIKI KAISHA, Tokyo (JP)

(72) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/891,854

(22) PCT Filed: May 7, 2014

(86) PCT No.: PCT/JP2014/062762
§ 371 (c)(1),
(2) Date: Nov. 17, 2015

(87) PCT Pub. No.: WO2014/199762
PCT Pub. Date: Dec. 18, 2014

(65) Prior Publication Data
US 2016/0094956 A1    Mar. 31, 2016

(30) Foreign Application Priority Data
Jun. 11, 2013  (JP) .................. 2013-123173

(51) Int. Cl.
*H04W 4/06*       (2009.01)
*H04W 8/00*       (2009.01)
*H04L 29/12*      (2006.01)

(52) U.S. Cl.
CPC .......... *H04W 4/06* (2013.01); *H04L 61/2007* (2013.01); *H04W 8/005* (2013.01)

(58) Field of Classification Search
CPC ....... H04W 80/04; H04W 8/26; H04W 24/00; H04W 4/06; H04W 8/005;
(Continued)

(56) References Cited

U.S. PATENT DOCUMENTS 6,611,859 B1 * 8/2003 Kohno .................... H04L 29/06
370/286
7,389,448 B2   6/2008 Sakai ............................ 714/48
(Continued)

FOREIGN PATENT DOCUMENTS

JP    2007-081497    3/2007
JP    2009-065688    3/2009
(Continued)

OTHER PUBLICATIONS

Japanese Office Action issued in corresponding Japanese Application No. 2013-123173 dated Jun. 9, 2017.

*Primary Examiner* — Brenda H Pham
(74) *Attorney, Agent, or Firm* — Fitzpatrick, Cella, Harper & Scinto

(57) ABSTRACT

A communication apparatus creates a network, assigns information necessary for performing communication in the created network to each of other communication apparatuses which have joined the network, and searches for a communication apparatus having a specific service function. Upon completion of assignment of the information necessary for performing communication in the created network, the communication apparatus starts the search.

8 Claims, 6 Drawing Sheets

(58) Field of Classification Search
CPC ............... H04W 61/2007; H04L 43/50; H04L 43/0852; H04L 61/2007; H04L 43/08; H04L 45/02; H04L 41/12; H04L 45/00; H04L 45/04; H04L 43/12; H04L 5/14; H04B 17/003
USPC .................... 370/349, 252, 255, 276, 277
See application file for complete search history.

(56) References Cited

U.S. PATENT DOCUMENTS

| | | | |
|---|---|---|---|
| 7,720,477 B2 | 5/2010 | Moritomo et al. | 455/435.1 |
| 7,882,196 B2 | 2/2011 | Fujii et al. | 709/208 |
| 8,406,208 B2 | 3/2013 | Nakajima | 370/338 |
| 8,503,933 B2 | 8/2013 | Moritomo et al. | 455/41.2 |
| 8,572,222 B2 | 10/2013 | Sakai et al. | 709/223 |
| 8,634,371 B2 | 1/2014 | Nakajima | 370/329 |
| 9,369,963 B2 * | 6/2016 | Kawakita | H04W 52/0251 |
| 2002/0035621 A1 * | 3/2002 | Zintel | H04L 12/2805 709/220 |
| 2006/0156388 A1 * | 7/2006 | Stirbu | H04L 63/0807 726/4 |
| 2006/0294227 A1 * | 12/2006 | Goto | H04L 41/12 709/224 |
| 2008/0052384 A1 * | 2/2008 | Marl | H04L 12/2807 709/223 |
| 2012/0099572 A1 | 4/2012 | Kato et al. | 370/338 |
| 2013/0142077 A1 | 6/2013 | Nakajima | 370/254 |
| 2013/0301081 A1 | 11/2013 | Moritomo et al. | 358/1.15 |
| 2014/0023061 A1 | 1/2014 | Sakai et al. | 370/338 |
| 2016/0094956 A1 | 3/2016 | Sakai | H04W 4/06 |

FOREIGN PATENT DOCUMENTS

| | | |
|---|---|---|
| JP | 2009-225060 | 10/2009 |
| JP | 2012-090205 | 5/2012 |
| JP | 2013026981 A | 2/2013 |
| JP | 2013066076 A | 4/2013 |

* cited by examiner

COMMUNICATION APPARATUS, CONTROL METHOD THEREFOR, PROGRAM, AND STORAGE MEDIUM

TECHNICAL FIELD

The present invention relates to a communication apparatus, a control method therefor, a program, and a storage medium.

BACKGROUND ART

In wireless communication represented by a wireless LAN complying with the IEEE802.11 standard series, an infrastructure mode in which an access point (base station) controls a network is defined. In recent years, there has been proposed a communication method in which a communication apparatus such as a mobile phone or digital camera incorporating a wireless LAN communication function serves as a base station to perform communication with another communication apparatus in the infrastructure mode (Japanese Patent Laid-Open No. 2009-225060). A communication apparatus serving as a base station has a DHCP Server function like a general wireless LAN access point apparatus (for example, Japanese Patent Laid-Open No. 2012-90205), and can assign IP addresses to communication apparatuses on the network using the DHCP protocol.

An example of a method of automatically discovering services provided by communication apparatuses on a local area network includes a discovery protocol such as UPnP (Universal Plug and Play). Applying the above-described communication method enables the communication apparatus serving as a base station to execute a search process using the discovery protocol after creating a network by itself, and to detect an opposite communication apparatus having a desired service.

When the communication apparatus serving as a base station executes a search process using the discovery protocol on the network created by itself, the timing of starting the search process becomes a problem. For UPnP, for example, upon start of the search process, the communication apparatus serving as a base station detects an opposite communication apparatus by multicasting a search message (SSDP M-Search) which requires a response from another communication apparatus having a desired service, and receiving a response to the message. Even if, however, the communication apparatus transmits a search message immediately after the network is created, the other communication apparatus has not joined the network yet and, therefore, the communication apparatus serving as a base station cannot receive a response to the search message, and cannot detect the opposite communication apparatus.

Conventionally, a base station never performs a service search, and a process of controlling other communication apparatuses to join the network and a search process using the discovery protocol do not cooperatively operate in the communication apparatus serving as a base station. Consequently, when a long time elapses after other communication apparatuses join the network, if the communication apparatus serving as a base station transmits a search message, it may take time for the communication apparatus serving as a base station to detect an opposite communication apparatus. As described above, the communication apparatus serving as a base station cannot execute a search process at an appropriate timing, thereby impairing the user convenience.

SUMMARY OF INVENTION

The present invention has been made in consideration of the above problem, and provides a technique in which a communication apparatus serving as a base station efficiently and promptly detects an opposite communication apparatus.

According to first aspect of the present invention, there is provided a communication apparatus comprising: control means for creating a network; assignment means for assigning information necessary for performing communication in the network created by the control means to each of other communication apparatuses which have joined the network; and search means for searching the other communication apparatuses for a communication apparatus having a specific service function, wherein the search means starts the search after the assignment means assigns the information.

According to second aspect of the present invention, there is provided a control method for a communication apparatus comprising: a control step of creating a network; an assignment step of assigning information necessary for performing communication in the network created in the control step to each of other communication apparatuses which have joined the network; and a search step of searching the other communication apparatuses for a communication apparatus having a specific service function, wherein in the search step, the search starts upon completion of assignment of the information.

Further features of the present invention will become apparent from the following description of exemplary embodiments (with reference to the attached drawings).

DESCRIPTION OF EMBODIMENTS

First Embodiment

A communication apparatus according to this embodiment will be described in detail below with reference to the accompanying drawings. Although a case in which a wireless LAN system complying with the IEEE802.11 standard series is used will be explained below, a communication mode is not necessarily limited to a wireless LAN complying with the IEEE802.11 standard.

Figure 1:
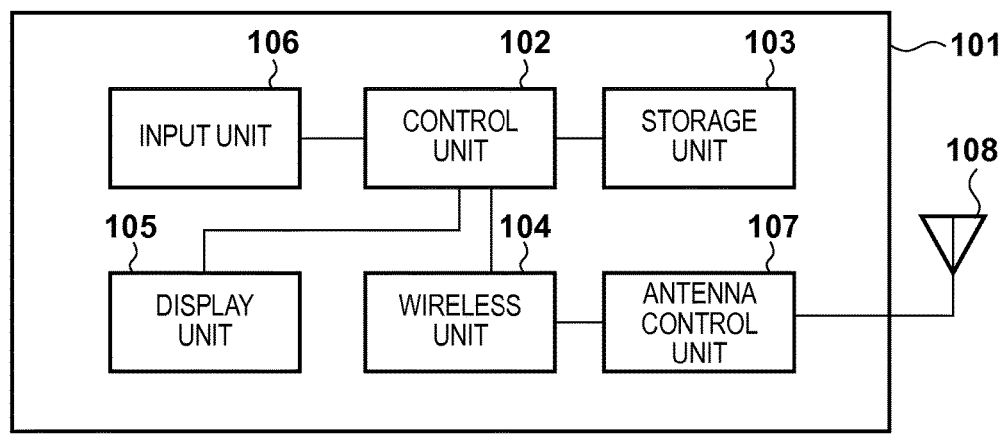
FIG. 1 is a block diagram showing the arrangement of a communication apparatus according to the first embodiment.

A hardware arrangement in a suitable example of the embodiment will be described. FIG. 1 is a block diagram showing an example of a hardware arrangement 101 of a communication apparatus according to this embodiment. A control unit 102 is a computer such as a CPU or MPU, and controls the overall apparatus by executing control programs stored in a storage unit 103. The control unit 102 also controls a communication parameter automatic setting system with another apparatus. The storage unit 103 stores computer programs for control operations executed by the control unit 102, and various kinds of information such as communication parameters. Various operations (to be described later) are performed when the control unit 102 executes the control programs stored in the storage unit 103. Note that the storage unit 103 can be implemented using a memory such as a ROM or RAM, a flexible disk, a hard disk, an optical disk, a magnetooptical disk, a CD-ROM, a CD-R, magnetic tape, a non-volatile memory card, a DVD, or the like.

A wireless unit 104 performs a process for wireless communication. A display unit 105 has a function of outputting visually perceivable information like an LCD or LED, and a function of outputting sound like a loudspeaker, and performs various display operations. An input unit 106 is used by the user to perform various input operations. An antenna control unit 107 and an antenna 108 are used for wireless communication. Note that FIG. 1 shows an example, and the communication apparatus may have a hardware arrangement other than that shown in FIG. 1. For example, if the communication apparatus is a printer, it includes a printing unit. If the communication apparatus is a digital camera, it includes an imaging unit.

Figure 2:
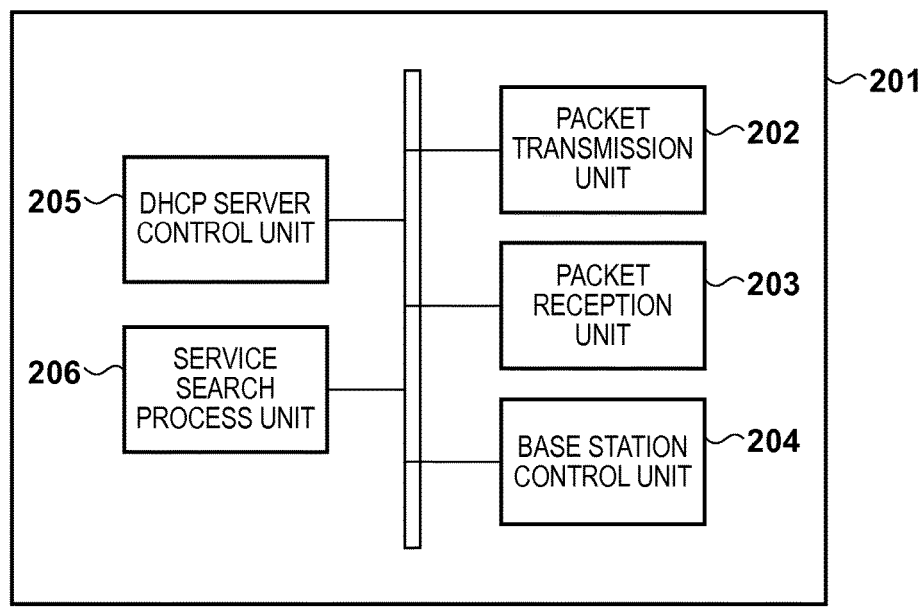
FIG. 2 is a block diagram showing the software functions of the communication apparatus according to the first embodiment.

FIG. 2 is a block diagram showing an example of an arrangement 201 of software functions executed by the communication apparatus according to this embodiment. A packet transmission unit 202 transmits packets associated with various communication processes. The packet transmission unit 202 transmits each signal (to be described later). A packet reception unit 203 receives packets associated with various communication processes. The packet reception unit 203 receives each signal (to be described later). A base station control unit 204 controls an operation as a base station for wireless LAN infrastructure communication. The base station control unit 204 performs a process operation by a base station in the wireless LAN network, such as creation of a network, transmission of a beacon signal, and a process and management of connection with another communication apparatus. A DHCP server control unit 205 controls an operation as a DHCP server. The DHCP server control unit 205 performs an operation of assigning IP addresses by the DHCP protocol (to be described later). A service search process unit 206 searches apparatuses on the network for an apparatus having a specific desired service using a discovery protocol. The service search process unit 206 executes a service search process (to be described later). Note that the service search process in this embodiment will be explained using UPnP as a discovery protocol for IP communication. However, another discovery protocol for IP communication such as Multicast DNS may be used. Note that all the function blocks shown in FIG. 2 are not limited to those provided as software components and some of them may be provided as hardware components. The respective function blocks shown in FIG. 2 have mutual relations. The respective function blocks shown in FIG. 2 are merely an example. A plurality of function blocks may form one function block, or any one of the function blocks may be divided into a plurality of functions.

Figure 3:
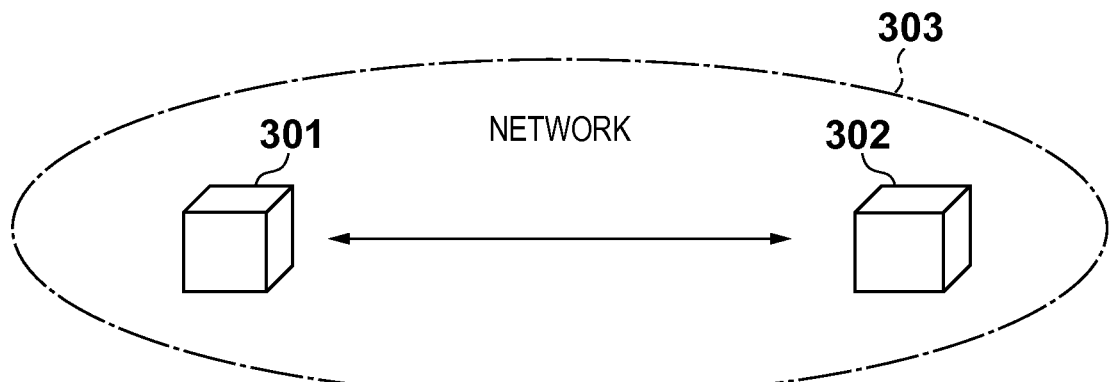
FIG. 3 is a view showing a network arrangement according to the first embodiment.

FIG. 3 is a view showing a communication apparatus 301 serving as a base station, a communication apparatus 302 connected to the communication apparatus 301, and a network 303 created by the communication apparatus 301. The communication apparatus 301 has the arrangement shown in FIGS. 1 and 2 described above. In the embodiment, the communication apparatus 302 has a service function desired by the communication apparatus 301, and notifies, using the UPnP protocol, the communication apparatus 301 that the self apparatus has the desired service.

Figure 4:
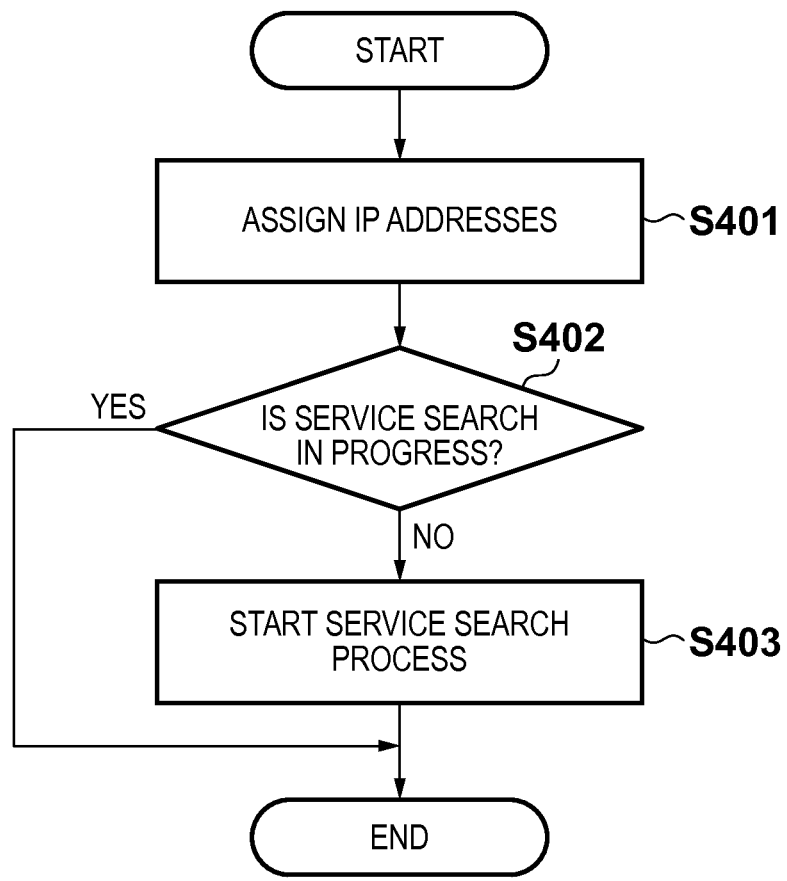
FIG. 4 is a flowchart illustrating the operation of a process at joining a network according to the first embodiment.

FIG. 4 is a flowchart illustrating the operation of a process at joining, which is executed by the communication apparatus 301 when other communication apparatuses including the communication apparatus 302 join the network 303. The operation shown in FIG. 4 is performed when the control unit 102 reads out and executes the computer programs stored in the storage unit 103. After other communication apparatuses join the network 303, the DHCP server control unit 205 communicates, using the DHCP protocol, with the other communication apparatuses which have joined the network, and assigns IP addresses as information necessary for communication (step S401).

Upon completion of assignment of the IP addresses, that is, after the DHCP server control unit 205 transmits a DHCP ACK message to each of the other communication apparatuses which have joined the network, the service search process unit 206 confirms whether the service search process is already in progress (step S402). Note that the service search process will be described later. If the service search process is in progress (YES in step S402), the service search process unit 206 terminates the process at joining. On the other hand, if the service search process has not been executed (NO in step S402), the service search process unit 206 starts the service search process (step S403), and then terminates the process at joining.

Note that in step S402, the service search process unit 206 may receive an ARP message associated with the assigned IP address from each of the other communication apparatuses which have joined the network, update an entry in an ARP table, and then confirm whether the service search process is already in progress. Note that the APR message is a response message to the ARP request transmitted by the communication apparatus 301, and a message sent from each of the other communication apparatuses in which the IP address designated in the ARP request has been set. In the ARP message, information of the IP address and MAC address of each of the other communication apparatuses is described. The ARP table is a table indicating a correspondence between an IP address and MAC address. In this case, since the service search process unit 206 executes the service search process after confirming that the assigned IP address has been set in each of the other communication apparatuses which have joined the network, the service search process can be more accurately executed for the other communication apparatuses which have joined the network.

Figure 5:
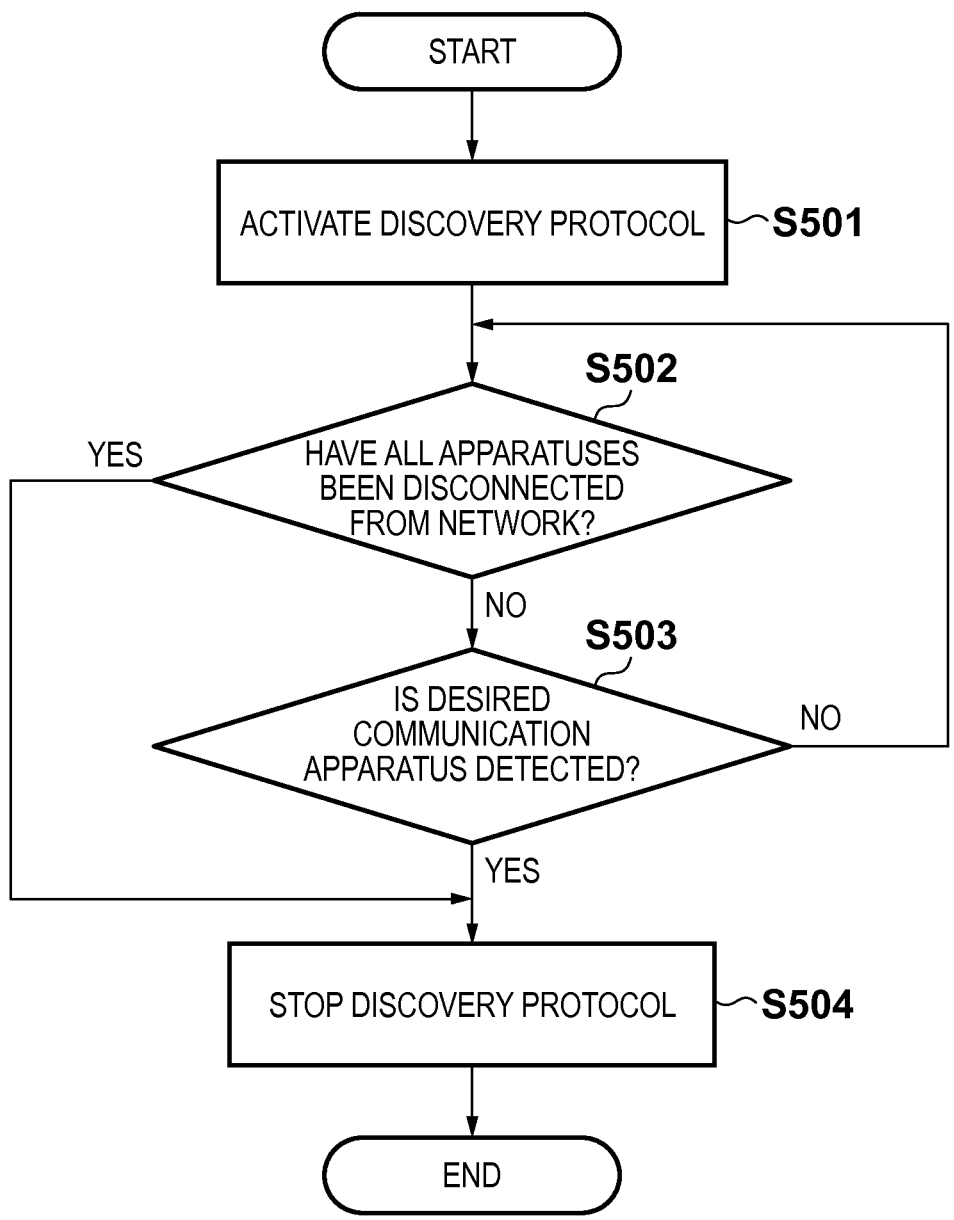
FIG. 5 is a flowchart illustrating the operation of a service search process according to the first embodiment.

FIG. 5 is a flowchart illustrating the operation of the service search process executed by the communication apparatus 301. The operation shown in FIG. 5 is performed when the control unit 102 reads out and executes the computer programs stored in the storage unit 103. Upon start of the service search process, the service search process unit 206 activates a discovery protocol, and starts to search for an apparatus having a desired service (step S501). In this embodiment, in step S501, the service search process unit 206 multicasts an SSDP M-Search message as a UPnP search message, and stands by for a response from the apparatus having the desired service. Note that the service search process unit 206 may transmit a search message at predetermined intervals a plurality of times. When the service search process unit 206 transmits the search message a plurality of times, even if the other communication apparatus enters a state in which it can return a response after the search message is transmitted for the first time, it is possible to promptly receive a response to the next search message.

After the discovery protocol is activated, the service search process unit 206 confirms, with the base station control unit 204, whether all the other communication apparatuses which have joined the network have been disconnected from the network after the activation of the protocol (step S502). If all the other communication apparatuses have been disconnected from the network (YES in step S502), the service search process unit 206 stops the discovery protocol (step S504), and terminates the service search process. This can prevent unnecessary transmission of the search message to which no response can be expected. On the other hand, if one or more other communication apparatuses have joined the network (NO in step S502), the service search process unit 206 confirms the presence/absence of a response, to the search message transmitted in step S501, from the apparatus having the desired service (step S503). If the service search process unit 206 receives a response from the communication apparatus 302 having the desired service (YES in step S503), it stops the discovery protocol (step S504), and terminates the service search process. On the other hand, if the service search process unit 206 receives no response from the communication apparatus 302 having the desired service (NO in step S503), it returns the process to step S502 to continue the service search process.

As described above, the communication apparatus according to this embodiment executes the service search process after assigning IP addresses. In this embodiment, this can prevent the search message from being unnecessarily transmitted during a period when the other communication apparatuses cannot perform IP communication, that is, during a period when no response to the UPnP search message can be expected. The communication apparatus according to this embodiment executes the service search process after assigning the IP addresses. In this embodiment, this makes it possible to promptly detect the communication apparatus having the desired service function after the communication apparatus joins the network.

Figure 6:
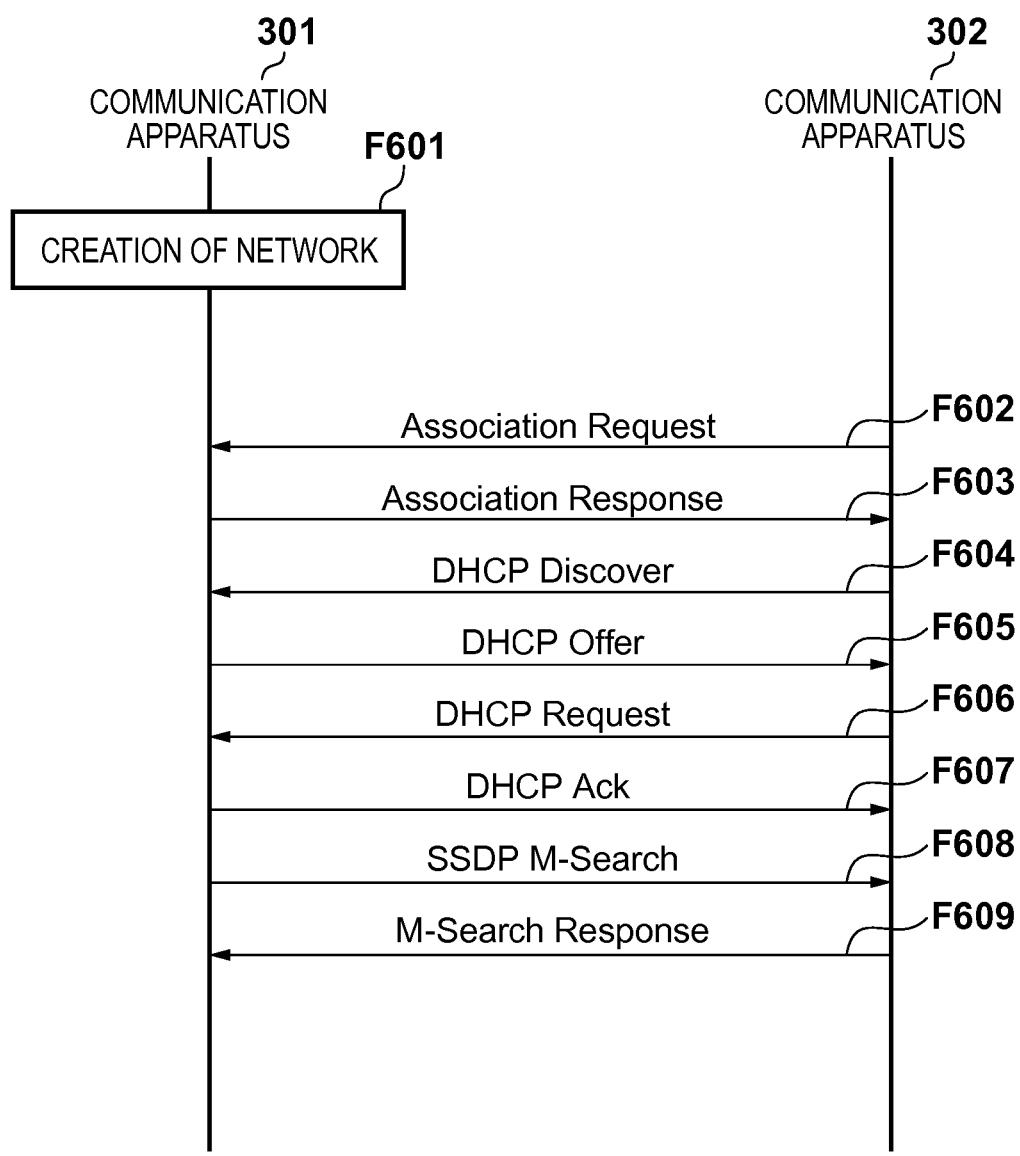
FIG. 6 is a first operation sequence chart according to the first embodiment.

FIG. 6 shows an operation sequence when the service search process unit 206 of the communication apparatus 301 detects the communication apparatus 302 after the communication apparatus 302 joins the network created by the communication apparatus 301. The communication apparatus 301 starts the operation of a base station, and creates the network 303 (F601). The communication apparatus 302 transmits a connection request (Association Request) to the communication apparatus 301, and receives a connection response (Association Response) from the communication apparatus 301, thereby joining the network 303 (F602 and F603).

The communication apparatus 301 executes the process at joining described with reference to FIG. 4, and exchanges messages defined by the DHCP protocol with the communication apparatus 302, thereby assigning an IP address to the communication apparatus 302 (F604, F605, F606, and F607). Furthermore, the communication apparatus 301 executes the service search process described with reference to FIG. 5, and multicasts a search message (SSDP M-Search). After that, the communication apparatus 301 detects the communication apparatus 302 as an apparatus having a desired service function by receiving a response to the search message from the communication apparatus 302 (F608 and F609).

Figure 7:
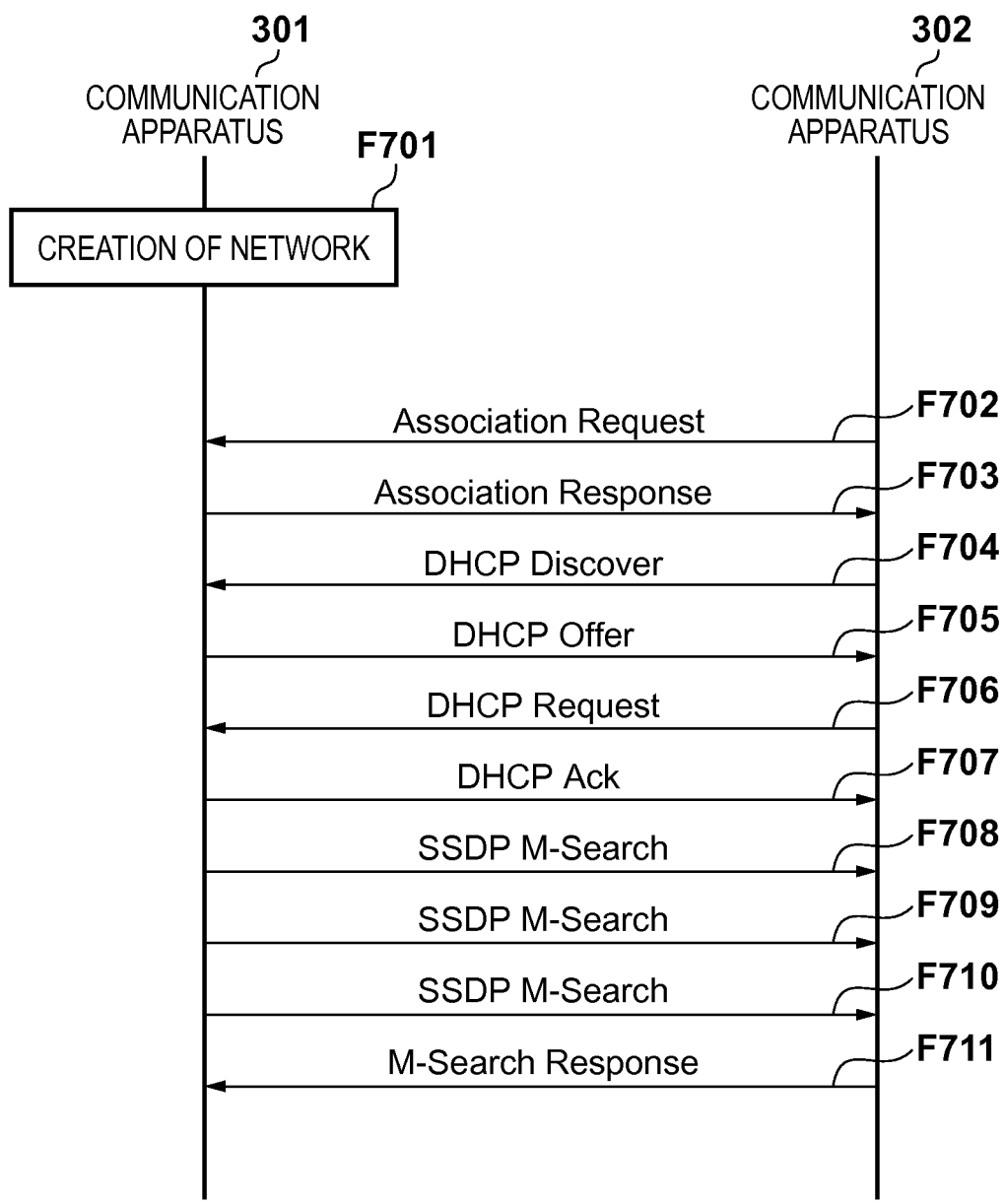
FIG. 7 is a second operation sequence chart according to the first embodiment.

FIG. 7 shows an operation sequence when the communication apparatus 302 is detected after the communication apparatus 302 joins the network created by the communication apparatus 301 and then the service search process unit 206 of the communication apparatus transmits a search message a plurality of times. The communication apparatus 301 starts the operation of a base station, and creates the network 303 (F701). The communication apparatus 302 transmits a connection request (Association Request) to the communication apparatus 301, and receives a connection response (Association Response) from the communication apparatus 301, thereby joining the network 303 (F702 and F703).

The communication apparatus 301 executes the process at joining described with reference to FIG. 4, and exchanges messages defined by the DHCP protocol with the communication apparatus 302, thereby assigning an IP address to the communication apparatus 302 (F704, F705, F706, and F707). Furthermore, the communication apparatus 301 executes the service search process described with reference to FIG. 5, and multicasts a search message (SSDP M-Search) (F708). At this time, the discovery protocol of the communication apparatus 302 has not been activated yet, and the communication apparatus 302 transmits no response to the search message. The communication apparatus 301 retransmits the search message at predetermined intervals (F709 and F710). After the search message is received in F709, the communication apparatus 302 activates the discovery protocol, and transmits a response to the search message received in F710 (F711). The communication apparatus 301 detects the communication apparatus 302 as an apparatus having a desired service function by receiving the response to the search message from the communication apparatus 302 (F711).

Figure 8:
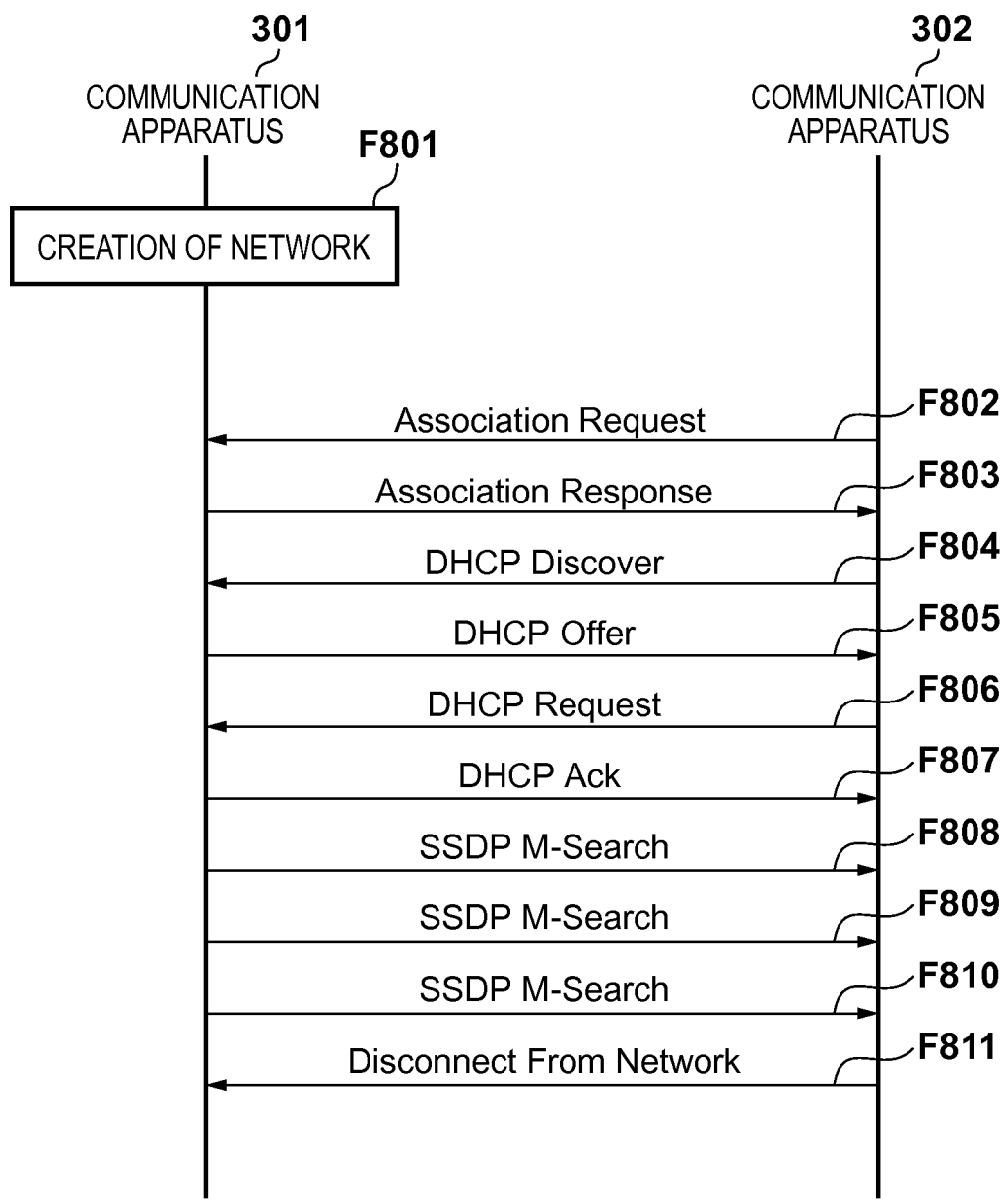
FIG. 8 is a third operation sequence chart according to the first embodiment.

FIG. 8 shows an operation sequence when the service search process unit 206 of the communication apparatus executes the service search process after the communication apparatus 302 joins the network created by the communication apparatus 301, and the communication apparatus 302 is disconnected from the network without sending a response to a search message. The communication apparatus 301 starts the operation of a base station, and creates the network 303 (F801). The communication apparatus 302 transmits a connection request (Association Request) to the communication apparatus 301, and receives a connection response (Association Response) from the communication apparatus 301, thereby joining the network 303 (F802 and F803).

The communication apparatus 301 executes the process at joining described with reference to FIG. 4, and exchanges messages defined by the DHCP protocol with the communication apparatus 302, thereby assigning an IP address to the communication apparatus 302 (F804, F805, F806, and F807). Furthermore, the communication apparatus 301 executes the service search process described with reference to FIG. 5, and multicasts a search message (SSDP M-Search) (F808). At this time, the discovery protocol of the communication apparatus 302 has not been activated yet, and the communication apparatus 302 transmits no response to the search message. The communication apparatus 301 retransmits the search message at predetermined intervals (F809 and F810). At this time, the communication apparatus 302 is disconnected from the network 303 (F811). Upon detecting disconnection of the communication apparatus 302, the communication apparatus 301 stops the service search process, and stops retransmission of the search message (F811). As described above, executing the processes described with reference to FIGS. 4 and 5 enables the communication apparatus 301 to promptly detect the communication apparatus 302 while suppressing unnecessary transmission of the search message.

Although the embodiment of the present invention has been described, it is merely an example for description of the present invention, and does not limit the scope of the present invention. Various modifications can be made to the embodiment without departing from the spirit and scope of the present invention. Furthermore, a wireless LAN complying with the IEEE802.11 standard has been explained above as an example. The present invention, however, may be implemented in another wireless medium such as wireless USB, MBOA, Bluetooth®, UWB, or ZigBee. Note that MBOA is an abbreviation for Multi Band OFDM Alliance. UWB includes wireless USB, wireless 1394, and WINET.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-123173, filed Jun. 11, 2013 which is hereby incorporated by reference herein in its entirety.

The invention claimed is:

1. A communication apparatus comprising:
a memory storing instructions; and
at least one processor that, upon execution of the stored instructions, performs the functions of:
a control unit configured to create a wireless network;
an assignment unit configured to assign, by using a DHCP (Dynamic Host Configuration Protocol), an IP (Internet Protocol) address necessary for performing communication in the wireless network created by the control unit to another communication apparatus which has joined the wireless network; and
a search unit configured to transmit a search message for searching for an apparatus having a specific service function in the wireless network,
wherein, the search unit does not transmit the search message until the assignment unit transmits a DHCP ACK (Acknowledgment) message to said another communication apparatus in response to an assignment of the IP address to said another communication apparatus, and the search unit transmits the search message after the assignment unit transmits the DHCP ACK message to said another communication apparatus in response to an assignment of the IP address to said another communication apparatus, and
wherein the search unit starts the transmission of the search message after an ARP (Address Resolution Protocol) message obtained from the IP address is received from said another communication apparatus to update an ARP table.

2. The apparatus according to claim 1, wherein the search unit transmits the search message at predetermined intervals.

3. The apparatus according to claim 1, wherein the communication apparatus operates as a base station in the wireless network.

4. The apparatus according to claim 1, wherein the search message is a search message using an IP address.

5. The apparatus according to claim 4, wherein the search message is a search message used in UPnP (Universal Plug and Play).

6. The apparatus according to claim 5, wherein the search message is a SSDP (Simple Service Discovery Protocol) M-Search message.

7. A control method for a communication apparatus comprising:
creating a wireless network;
assigning, by using a DHCP (Dynamic Host Configuration Protocol), an IP (Internet Protocol) address necessary for performing communication in the wireless network to another communication apparatus which has joined the wireless network; and
transmitting a search message for searching for an apparatus having a specific service function in the wireless network, wherein
the search message is not transmitted until a DHCP ACK (Acknowledgment) message has been transmitted to said another communication apparatus in response to an assignment of the IP address to said another communication apparatus, and the search message is transmitted after the DHCP ACK message is transmitted to said another communication apparatus in response to an assignment of the IP address to said another communication apparatus, and
the transmission of the search message is started after an ARP (Address Resolution Protocol) message obtained from the IP address is received from said another communication apparatus to update an ARP table.

8. A non-transitory computer-readable storage medium storing a computer program for causing a computer to execute a method, the method comprising:
creating a wireless network;
assigning, by using a DHCP (Dynamic Host Configuration Protocol), an IP (Internet Protocol) address necessary for performing communication in the wireless network to another communication apparatus which has joined the wireless network; and
transmitting a search message for searching for an apparatus having a specific service function in the wireless network, wherein
the search message is not transmitted until a DHCP ACK (Acknowledgment) message has been transmitted to said another communication apparatus in response to an assignment of the IP address to said another communication apparatus, and the search message is transmitted after the DHCP ACK message is transmitted to said another communication apparatus in response to an assignment of the IP address to said another communication apparatus, and the transmission of the search message is started after an ARP (Address Resolution Protocol) message obtained from the IP address is received from said another communication apparatus to update an ARP table.

* * * * *